United States Patent [19]

Crotts

[11] Patent Number: 4,991,316

[45] Date of Patent: Feb. 12, 1991

[54] BLOWER MANIFOLD ASSEMBLY FOR VEHICLE DRYING

[75] Inventor: Lon Crotts, Summerfield, N.C.

[73] Assignee: Bivens Winchester Corporation, Danville, Va.

[21] Appl. No.: 307,158

[22] Filed: Feb. 6, 1989

Related U.S. Application Data

[63] Continuation of Ser. No. 90,233, Aug. 27, 1987, abandoned.

[51] Int. Cl.⁵ .............................................. F26B 19/00
[52] U.S. Cl. ..................................... 34/243 C; 34/232
[58] Field of Search ........................... 34/229, 243 L; 15/243 R; 239/548

[56] References Cited

U.S. PATENT DOCUMENTS

| | | | |
|---|---|---|---|
| 2,440,157 | 4/1948 | Rousseau | 34/229 |
| 2,448,834 | 9/1948 | Rousseau | 34/243 C |
| 2,803,892 | 8/1957 | Hurst | 34/229 |
| 3,808,703 | 5/1974 | Kamiya | 34/243 C |
| 4,523,391 | 6/1985 | Smith et al. | 34/160 |
| 4,561,193 | 12/1985 | Burger | 34/229 |

Primary Examiner—Henry A. Bennet
Attorney, Agent, or Firm—Krass & Young

[57] ABSTRACT

A vehicle drying apparatus comprising a V-shaped blower manifold having air supply means and nozzle means. The V-shaped blower manifold can be movably supported in an automated car wash to direct a V-shaped curtain of blown air against the surface of a vehicle moving relative to the manifold, stripping water from the vehicle surface both rearwardly and laterally. Soft, flexible air channeling means are fastened to the nozzle means to increase the rate of flow of air to the vehicle surface. Also disclosed is a gantry frame for supporting the blower manifold in selected positions over the vehicle and for housing blower assemblies for directing pressurized air to the manifold.

11 Claims, 2 Drawing Sheets

U.S. Patent  Feb. 12, 1991  Sheet 1 of 2  4,991,316
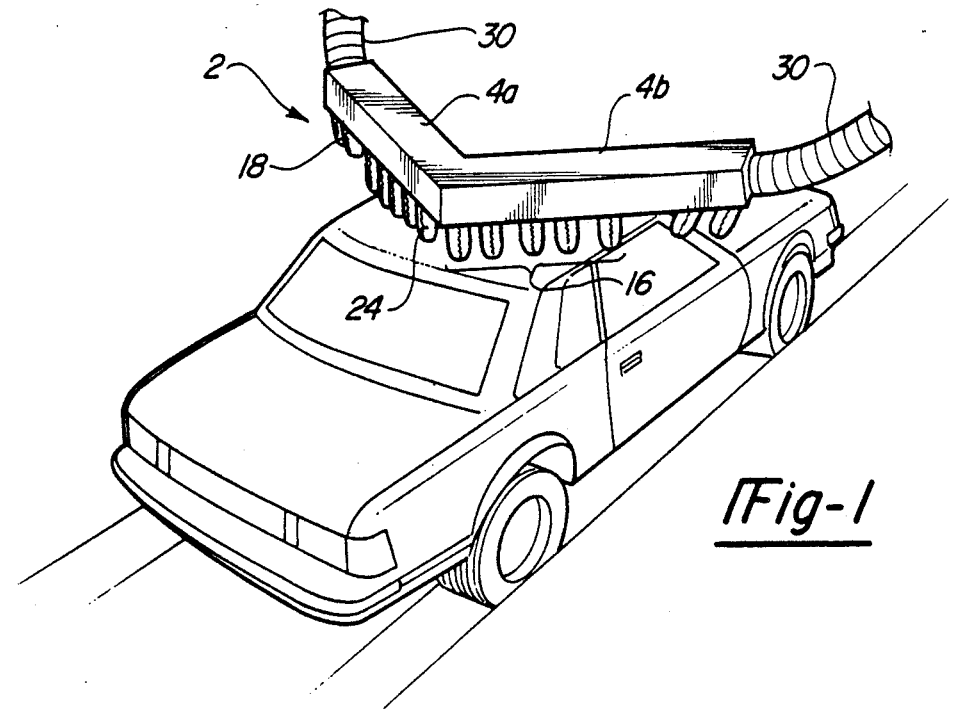
_Fig-1_
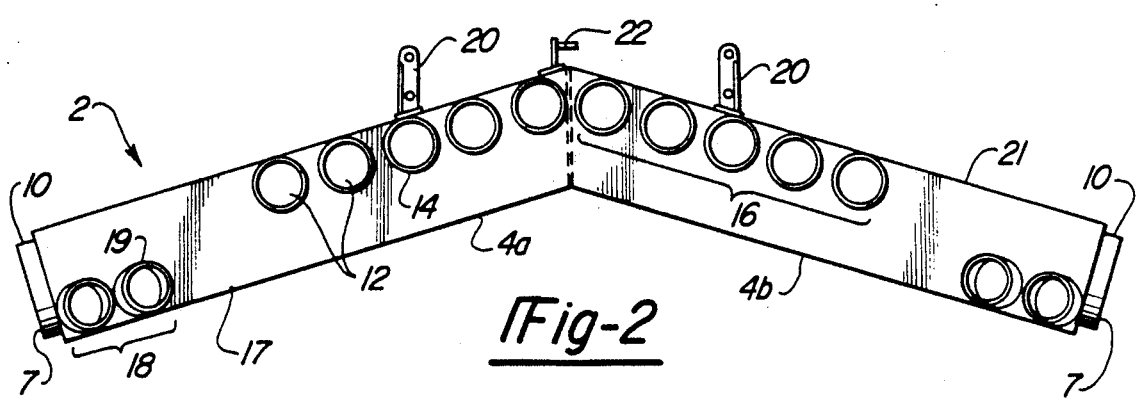
_Fig-2_
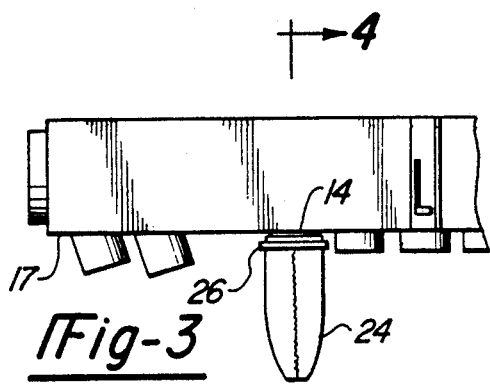
_Fig-3_
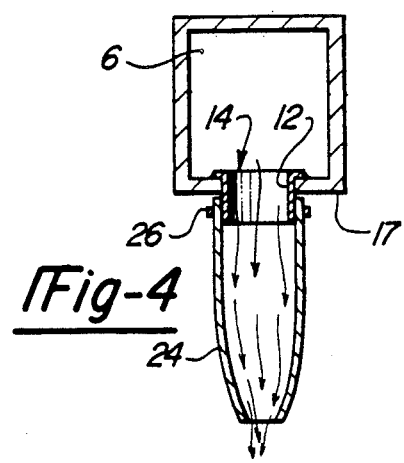
_Fig-4_

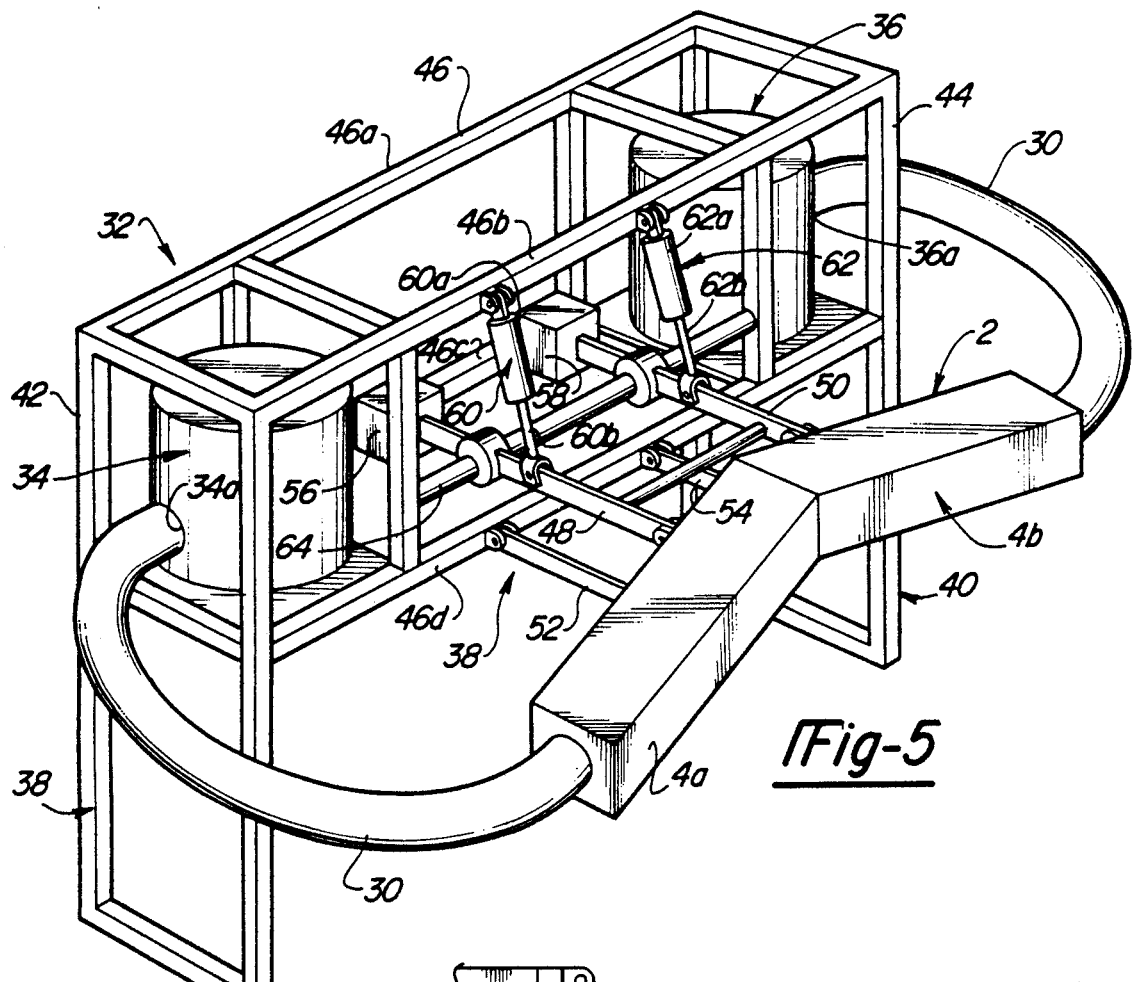
_Fig-5_
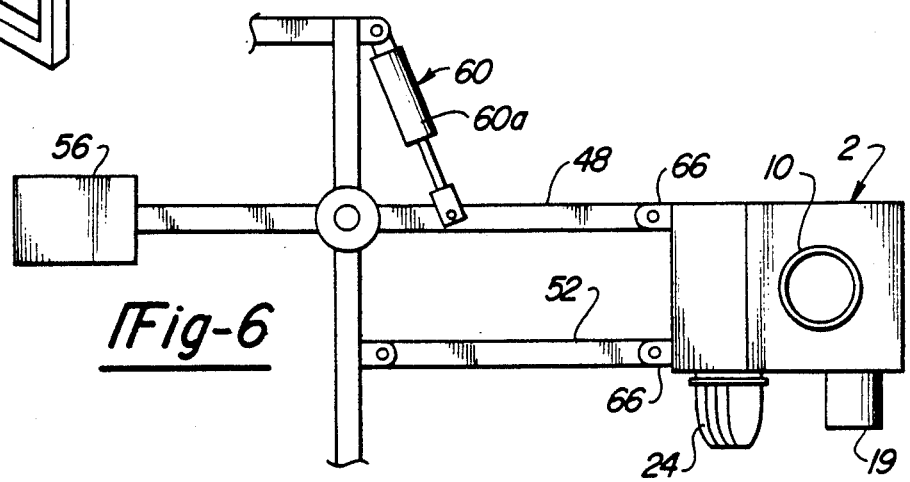
_Fig-6_
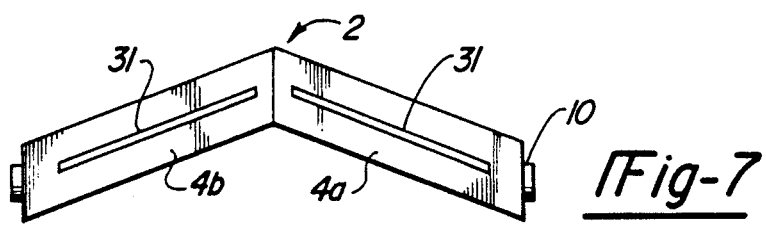
_Fig-7_

BLOWER MANIFOLD ASSEMBLY FOR VEHICLE DRYING

This is a continuation of co-pending application Ser. No. 090,233 filed on Aug. 27, 1987, now abandoned.

INTRODUCTION

This invention relates to apparatus for removing water from the surface of vehicles using blown air. More particularly, the present invention is drawn to a vehicle drying apparatus for use in automated vehicle washing systems wherein a washed vehicle is dried by way of a V-shaped curtain of air passing over the length of the vehicle stripping water droplets from its surface both rearwardly and laterally.

BACKGROUND OF THE INVENTION

The method of drying vehicles using air-blowing devices is well known in the art of vehicle washing. Typically, jets of air are directed onto a vehicle surface by nozzle means arranged on a blower manifold blowing or sweeping water off the vehicle from front to back. A problem inherent with this method is that water begins to accumulate as it is blown from front to back, increasing the likelihood that the jets of air will either miss some of the water or be unable to completely remove it from the vehicle surface. A solution to this problem has been to provide a V-shaped curtain of air to sweep water both laterally and rearwardly relative to the vehicle surface. This has been done by arranging a set of air-directing nozzles in a triangular pattern on a manifold, such as is shown by U.S. Pat. No. 4,561,193. While this arrangement does create a V-shaped curtain of air, there are several disadvantages to this triangular grouping on a conventional manifold. The air blown onto the vehicle must be traveling at a high velocity to move the water droplets clinging to its surface. To create a curtain of air having a sufficient width to sweep water from the entire top surface of a vehicle, the nozzle openings of the triangular grouping would either have to be very large in diameter, requiring an enormously powerful blower to produce the same high velocity air flow as a more economical blower with smaller nozzle openings, or the manifold would have to be situated relatively far from the vehicle surface to provide sufficient coverage, in which case the velocity of the air would quickly dissipate before reaching the vehicle. Furthermore, in order to accommodate air-directing nozzles in a triangular grouping having a width at least approximating the width of a vehicle, the surface area of a conventional manifold on which the nozzle means is arrayed, and thus the manifold itself, would have to be fairly large and unwieldy.

SUMMARY OF THE INVENTION

Accordingly, it is an object of the present invention to provide air-drying means for more efficiently removing water from the surface of a vehicle both laterally and rearwardly relative to the vehicle, using a V-shaped curtain of air.

It is also an object of the present invention to channel the air blown onto a vehicle surface in a manner such that the air has sufficient force to remove water from the surface, using means that may contact the surface of the vehicle without damaging it.

These and other objects, which will become apparent upon a reading of the following specification and claims, are accomplished by way of a V-shaped blower manifold assembly which receives air from a blower and distributes it to nozzle means arranged along the side of the manifold adjacent the vehicle being dried. This creates a V-shaped curtain of air which contacts the vehicle surface and sweeps away water both laterally and rearwardly. The V-shaped manifold is a much more efficient means for creating a V-shaped curtain of air than a triangular arrangement of nozzles on a conventional manifold since a wide V-shaped curtain of air can be produced using any number of nozzles of various design, while keeping the size of the manifold relatively compact. To further increase the drying power of the invention manifold, soft, flexible means are provided for channeling and increasing the rate of flow of air from the nozzle means as close to the vehicle surface as possible without danger of damage to the vehicle in the event of contact between the air channeling means and the vehicle.

Also disclosed is a mounting assembly for positioning and powering the invention blower manifold. The mounting assembly includes a gantry frame, blower means mounted on the gantry frame, means on the gantry frame mounting the blower manifold forwardly of the gantry frame with respect to the direction of vehicle movement, and means communicating the output of the blower means with the blower manifold. This arrangement provides a compact and efficient assembly for positioning the manifold relative to the vehicles to be dried and for supplying pressurized air to the manifold to effectuate the drying operation.

BRIEF DESCRIPTION OF THE DRAWINGS

FIG. 1 is a perspective view of a vehicle being dried by a V-shaped blower manifold according to the present invention;

FIG. 2 is a bottom view of the V-shaped blower manifold;

FIG. 3 is a front view of one arm of the V-shaped blower manifold;

FIG. 4 is a cross-sectional view taken on line 4—4 of FIG. 3;

FIG. 5 is a perspective view of a vehicle manifold assembly according to the invention;

FIG. 6 is a somewhat schematic view of the invention blower manifold assembly; and FIG. 7 is a schematic view of a modified form a V-shaped blower manifold according to the invention.

DETAILED DESCRIPTION OF THE DRAWINGS

In the following specification and claims specific terminology is utilized in the interest of clarity and a particular embodiment described in accordance with the requirements of 35 USC 112, but it is to be understood that the same is not intended to be limiting as indeed the invention is capable of many variations within the scope of the appended claims.

Shown in FIGS. 1 and 2 are a V-shaped blower manifold 2 comprising two arm portions 4a and 4b. In the embodiment of FIG. 1, the effective width of the V-shaped blower manifold 2 is approximately ten feet from end to end. However, the V-shaped blower manifold 2 may be of any size as long as its effective width is at least the width of a vehicle. Arm portions 4a and 4b are relatively thin-walled, constructed of a material such as, but not limited to, sheet metal, and have a rectangular cross-section (see FIG. 4). One end of each arm portion 4a and 4b lies in a plane perpendicular to the planes of the sides of arm portion 4a and 4b, and the other end is beveled at an angle inclined from the perpendicular. Each arm portion 4a and 4b has a hollow interior portion 6 (see FIG. 4) comprising substantially the entire interior volume of arm portions 4a and 4b. The beveled ends of arm portions 4a and 4b are fastened together by any suitable means, such as bolting or welding so as to create a shallow "V" shape. The hollow interior portions 6 do not communicate when arm portions 4a and 4b are fastened together, since the beveled ends are closed.

Manifold 2 includes inlet means 7 for receiving air from air supply means. Inlet means 7 comprises a circular opening defined by an annular flange 10 formed in each unbeveled end of arm portions 4a and 4b. Manifold outlet means for directing the air received by the manifold inlet means onto a vehicle comprise a plurality of circular openings 12 defined by a plurality of annular flanges 14 arranged in a row along the underside 17 of each arm portion 4a, 4b and projecting downwardly from the underside of the manifold. A first group 16 of annular flanges 14 is positioned along the underside 17 of arm portions 4a and 4b to direct air onto the top surfaces of a vehicle, while a second group 18 of annular flanges 19 is positioned on the underside 17 of each arm portion 4a,4b adjacent the outer end of the arm portion. Flanges 19 are angled downwardly and inwardly toward the center of the manifold and are operative to direct air onto the side surfaces of a vehicle. Annular flanges 14 protrude a relatively short distance from underside 17, i.e., two inches, while angled annular flanges 19 protrude a relatively longer distance, e.g. four inches. The flanges 19 of group 18 are angled inwardly toward the vehicle at approximately 14° from the perpendicular to the underside 17 of manifold 2, but this angle is not intended to be limiting and may vary. A manifold stabilizer 22 is also fastened to the front side 21 of either arm portion 4a and 4b as close to the junction of the beveled edges as possible.

The foregoing description is a most preferred embodiment, and is not intended to be limiting. The manifold inlet means 7 does not have to be located on the ends of arm portions 4a and 4b, but can be placed almost anywhere on the V-shaped blower manifold 2 and still perform the same function. The manifold outlet means may assume various forms other than a row of circular openings 12, such as a continuous slit 31 running along the length of each arm portion 4a and 4b, as seen in FIG. 7. The angle between the arm portions 4a and 4b in the preferred embodiment is approximately 147°, but it is to be understood that this angle may vary considerably and still remain within the scope of the invention. Also, the cross-section of the V-shaped manifold 2 does not have to be rectangular, as long as the overall V-shape of the manifold is maintained.

Referring now to FIGS. 3 and 4, a soft flexible sock portion 24 made from a material such as, but not limited to, vinyl is shown fastened by means of a circular strap 26 to one of the annular flanges 14 of the manifold outlet means protruding from the bottom side 17 of the V-shaped blower manifold. Sock portion 24 is formed in essentially the shape of a hollow truncated cone, both ends of which are open. The larger diameter end of sock 24 is of a sufficient diameter to fit over one of flanges 14, and the diameter of the opposite tapered end is substantially smaller. The overall effect of sock 24 is that of a venturi, increasing the rate of flow of the air delivered from hollow interior portion 6 through the manifold outlet means to the surface of a vehicle thereby removing water from the vehicle surface more effectively. Because of the soft, yielding nature of sock portion 24, its outlet end can be brought very close to the vehicle surface, further enhancing the efficiency of the drying operation, without any danger of damage to the vehicle surface in the event of contact between the two. Circular strap 26 may be constructed from any suitable flexible material such as metal or plastic, and should be long enough to fit around the larger diameter end portion of sock 24 and clamp it tightly to flange 14.

FIG. 1 shows the V-shaped blower manifold 2 of the invention in a working relationship with a vehicle 28. Each arm portion 4a and 4b of manifold 2 is supplied with blown air by supply hoses 30. In this illustration, manifold 2 is equipped with sock portions 24 which serve to more efficiently channel air to the vehicle surface. As vehicle 28 moves in the direction of the arrow, V-shaped manifold 2 causes a V-shaped curtain of air to sweep water from the vehicle surface both rearwardly and laterally. The first group 16 of the manifold outlet means removes water from the top surfaces of vehicle 2 and the second group 18 of the manifold outlet means removes the water displaced by first group 16 from the side surfaces of the vehicle.

A blower manifold assembly embodying the invention blower manifold is seen in FIGS. 5 and 6. The blower manifold assembly, in addition to blower manifold 2, includes a gantry frame 32, a pair of blower assemblies 34 and 36, and a manifold control assembly 38. Gantry 32 is formed from a plurality of steel beam members of hollow, square cross-sectional configuration and defines tower portions 38 and 40, cage portions 42 and 44, and a central bridge portion 46. Tower portions 38 and 40 are spaced laterally a distance sufficient to allow passage of a vehicle 28 therebetween. Bridge portion 46 includes upper beam portions 46a and 46b interconnecting the upper ends of cage portions 42 and 44 and lower beam portions 46c and 46d interconnecting the lower ends of cage portions 42 and 44. Beam portions 46c and 46d are at a height sufficient to allow the passage of a vehicle 28 therebeneath.

Blower assemblies 34 and 36 are of any known form and are respectively positioned within gantry frame cage portions 42 and 44. Each blower assembly has an outlet 34a,36a, communicating with a respective hose 30 and operative to supply pressurized air respectively through hoses 30 to the respective manifold arms 4a and 4b.

Control assembly 38 comprises a pair of upper arms 48 and 50; a pair of lower arms 52 and 54; a pair of weights 56 and 58; and a pair of air cylinder assemblies 60 and 62.

Arms 48 and 50 are pivoted intermediate their ends on a transverse support bar 64 extending between gantry cage portions 42 and 44 generally above gantry beam portion 46d. Arms 48 and 50 are pivotally secured at their forward ends to laterally spaced locations on manifold 2 by suitable lugs 66 secured to the upper rear face of the manifold. Weights 56 and 58 are respectively secured to the rear ends of arms 48 and 50. Lower arms 52 and 54 are pivotally secured at their rear ends to beam portion 46d and at their forward ends to lugs 68 secured to the lower rear face of manifold 2. Arms 52 and 54 extend in parallel relation to arms 48 and 50.

Air cylinder assemblies 60 and 62 extend between beam portion 46b and arms 48 and 50 respectively.

Cylinder assemblies 60 and 62 include cylinders 60a,62a and piston rods 60b,62b. The respective upper ends of cylinders 60a,62a are pivotally secured to beam portion 46b and the respective lower ends of piston rods 60b,62b are pivotally secured to arms 48,50 forwardly of the pivotal connection of the arms to rod 64. The various dimensions of the various elements of control assembly 38 are chosen such that weights 56 and 58 are normally operative to pivot arms 48 and 50 in a counterclockwise direction as viewed in FIG. 6 so as to move manifold 2 in an upward direction with the upper limit of this counterclockwise pivotal movement being determined by bottoming of the pistons of cylinder assemblies 60,62 in the upper ends of the cylinders 60a,62a.

In operation, cylinder assemblies 60 and 62 are actuated to positively lower the manifold 2 to its operative position immediately above the roof of vehicles 28 passing therebeneath. Cylinder assemblies 60 and 62 may be selectively actuated to selectively adjust the height of manifold 2 to accommodate vehicles of varying height and configuration with arms 48 and 52 functioning effectively as a parallelogram linkage so that the up and down movement of the manifold 2 is essentially translatory. It will be noted that the control assembly 38 is a fail-safe device in the sense that, in the event that power to cylinders assemblies 60 and 62 is lost, weights 56 and 58 will function to raise the manifold 2 above the vehicle path so as to avoid any contact as between the manifold 2 and the vehicles passing therebeneath.

The invention manifold and manifold assembly will be seen to provide a ready and effective means of drying vehicles passing through a carwash. A V-shaped curtain of air directed onto the vehicle by manifold 2 effectively sweeps away water from the vehicle surface both laterally and rearwardly while the angled flanges 19 direct air onto the side surfaces of the vehicle to dry the side surfaces. The disclosed manifold assembly provides a compact and efficient means for effectively and adjustably positioning the manifold relative to the vehicles, provides fail-safe operation of the assembly, and provides a convenient means for housing the blower mechanisms required to supply pressurized air to the manifold.

Whereas preferred embodiments of the invention have been illustrated and described in detail, it will be apparent that various changes may be made in the disclosed embodiments without departing from the scope or spirit of the invention.

What is claimed is:

1. An air-blowing apparatus for removing water from a vehicle surface comprising:
   air supply means;
   a V-shaped blower manifold means having a hollow interior;
   means for transmitting the output of the air supply to the blower manifold means;
   manifold outlet means distributed substantially along the entire length of said V-shaped manifold means;
   said V-shaped manifold means being overall of a width at least approximately the width of a vehicle;
   said manifold outlet means comprises a plurality of circular openings, arranged evenly in a common plane along the length of each arm of said V-shaped manifold means adjacent a workpiece;
   said air channeling means removably fastened to said manifold outlet means to increase the efficiency of air flow to the workpiece; and
   said air channeling means comprises a plurality of soft, flexible sock portions each having a large circular open end of slightly larger diameter than said manifold outlet means, removably fastened to annular flanges protruding from said manifold outlet means, and another smaller diameter open end adjacent the workpiece.

2. Apparatus as defined in claim 1 wherein said sock portions approximate truncated cones so as to act as venturis, concentrating and increasing the rate of air flow to the workpiece.

3. Apparatus as defined in claim 2 wherein each of said sock portions is removably fastened to one of said protruding annular flanges by way of a flexible circular strap.

4. A manifold assembly for use in a vehicle drying installation, said assembly comprising:
   (A) a gantry frame adapted to be positioned in straddling relation to vehicles to be dried;
   (B) blower means mounted on said gantry frame;
   (C) a blower manifold having a width at least as great as the width of the vehicles to be dried;
   (D) means on said gantry frame mounting said blower manifold forwardly of said gantry frame with respect to the direction of vehicle movement in a position extending transversely of the vehicle path;
   (E) means communicating the output of said blower means with said blower manifold so as to enable said blower manifold to direct air downwardly against vehicles passing therebeneath to remove water from the vehicles;
   (F) said mounting means comprises an arm pivoted intermediate its end on said gantry frame and extending forwardly and rearwardly therefrom, means mounting said manifold to the forward end of said arm, a weight secured to the rearward end of said arm, and an air cylinder extending between said gantry frame and said arm; and
   (G) said weight is sized and positioned so as to be operative to raise said manifold in the event of failure of said air cylinder.

5. A vehicle manifold assembly according to claim 4 wherein:
   (H) said power cylinder extends between said gantry frame and a location on said arm between the pivot axis of the arm and said manifold.

6. A manifold assembly according to claim 5 wherein:
   (I) the forward end of said arm is pivotally secured to said manifold; and
   (J) said mounting means further includes a second arm positioned in parallel relation beneath said first arm, pivotally secured at its rearward end to said gantry frame generally beneath the pivotal connection of said first arm to said gantry frame and pivotally secured at its forward end to said manifold generally beneath the pivotal connection of said first arm to said manifold so that said first and second arms function as a parallelogram linkage to impart generally translatory movement to said manifold in response to upward and downward movement of said manifold upon actuation of said air cylinder.

7. A vehicle drying apparatus comprising:
   an air supply;
   plenum means overlying and extending substantially entirely across a vehicle drying location;
   means for transmitting the output of the air supply to the plenum;

a plurality of discrete air outlets distributed along the plenum; and a plurality of soft flexible substantially conical nozzles each having circular axial openings at the end, said nozzles being attached to said discrete outlets and oriented to emit air through said openings toward the exterior surface of a vehicle in said location.

8. The vehicle drying apparatus according to claim 7 wherein the flexible nozzles are removably fastened to said discrete air outlets with a flexible strap.

9. The vehicle drying apparatus according to claim 7 wherein the overhead plenum comprises two laterally contiguous plenum sections connected to form a V-shaped manifold containing a baffle preventing communication between said sections.

10. Apparatus for drying a washed vehicle in a vehicle drying location comprising:

an elongated air plenum;

support means disposing said plenum over and substantially entirely across said vehicle drying location;

a plurality of tubular, and substantially conical, flexible outlet air nozzles connected to and receiving air from said plenum and oriented substantially at right angles to said plenum for emitting air against the surface of a vehicle in said location, said tubular nozzles each having a circular end opening and extending toward but spaced from the surface of said vehicle; and means for supplying air to said plenum.

11. An air-blowing apparatus for removing water from a vehicle surface comprising:

air supply means;

a V-shaped blower manifold means having a hollow interior;

manifold outlet means distributed substantially along the entire length of said V-shaped manifold means;

manifold inlet means formed on said V-shaped manifold means;

means for transmitting the output of the air supply to the manifold inlet means;

said V-shaped manifold means being overall of a width at least approximately the width of a vehicle;

said V-shaped blower manifold means comprises two arm portions fastened together;

said V-shaped manifold means has one hollow interior portion extending essentially along the entire length of said arm; and the hollow interior portions do not communicate with each other.

* * * * *